(12) United States Patent
Dintheer

(10) Patent No.: US 10,060,183 B2
(45) Date of Patent: Aug. 28, 2018

(54) SEALING DEVICE AND FASTENING MEANS

(71) Applicant: Planet GDZ AG, Tagelswangen (CH)

(72) Inventor: Andreas Dintheer, Illnau (CH)

(73) Assignee: PLANET GDZ AG, Tagelswangen (CH)

(*) Notice: Subject to any disclaimer, the term of this patent is extended or adjusted under 35 U.S.C. 154(b) by 0 days.

(21) Appl. No.: 15/129,084

(22) PCT Filed: Mar. 25, 2015

(86) PCT No.: PCT/EP2015/056479
§ 371 (c)(1),
(2) Date: Sep. 26, 2016

(87) PCT Pub. No.: WO2015/144794
PCT Pub. Date: Oct. 1, 2015

(65) Prior Publication Data
US 2017/0107755 A1  Apr. 20, 2017

(30) Foreign Application Priority Data
Mar. 26, 2014  (EP) .................................. 14161656

(51) Int. Cl.
E06B 7/20      (2006.01)
E06B 7/21      (2006.01)
E06B 7/215     (2006.01)

(52) U.S. Cl.
CPC ................ E06B 7/21 (2013.01); E06B 7/215 (2013.01)

(58) Field of Classification Search
CPC ... E06B 7/20; E06B 7/28; E06B 7/215; E06B 7/02; E06B 5/10; E06B 5/20
See application file for complete search history.

(56) References Cited

U.S. PATENT DOCUMENTS 2,066,188 A     12/1936  Reese
3,871,133 A *   3/1975   Ellingson, Jr. ............ E06B 7/20
                                                       49/308
5,522,180 A *   6/1996   Adler ........................ E06B 7/20
                                                       49/307
6,125,584 A *   10/2000  Sanders .................. E06B 7/215
                                                       49/310
(Continued)

FOREIGN PATENT DOCUMENTS

EP    1122394 A2    8/2001
EP    1748142 A2    1/2007
(Continued)

Primary Examiner — Gilbert Y Lee
(74) Attorney, Agent, or Firm — Browdy and Neimark, P.L.L.C.

(57) ABSTRACT

The invention relates to a seal device for a door or a window having a housing rail (30) and a sealing strip (31, 32) retained in the housing rail (30). The seal also has at least one fastener (1) for fastening the housing rail (30) to a door leaf or window sash (T) of the door or window, wherein the fastener (1) comprises a plate (10) for lying on an end face of the door leaf or window sash (T) and a passage opening (12) for a screw (2), which passage opening is arranged in the plate (10). A retaining element (14, 43) for retaining the screw (2) is present in the passage opening (12). Said seal device enables one-handed mounting of the retaining bracket on the door leaf and thus makes the mounting of the seal easier.

23 Claims, 15 Drawing Sheets

(56) References Cited

U.S. PATENT DOCUMENTS

| | | | | |
|---|---|---|---|---|
| 8,381,448 | B2 * | 2/2013 | Flory | E06B 7/215 |
| | | | | 49/303 |
| 8,745,924 | B2 * | 6/2014 | Tshai | E06B 7/215 |
| | | | | 49/303 |
| 9,598,895 | B2 * | 3/2017 | Dintheer | E06B 7/02 |
| 9,803,418 | B2 * | 10/2017 | Dintheer | E06B 7/215 |

FOREIGN PATENT DOCUMENTS

| | | | |
|---|---|---|---|
| EP | 1772586 | A2 | 4/2007 |
| EP | 2305938 | A1 | 4/2011 |

* cited by examiner

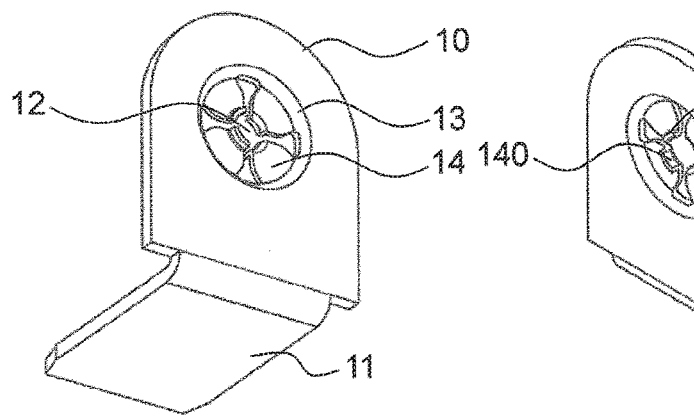
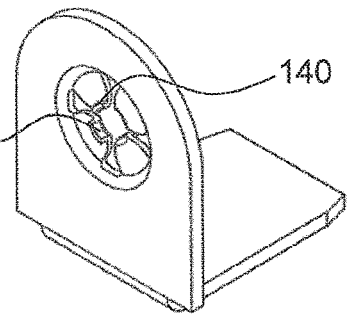
FIG. 39　　　　　　　　　　FIG. 40
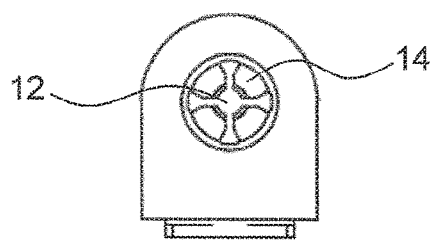
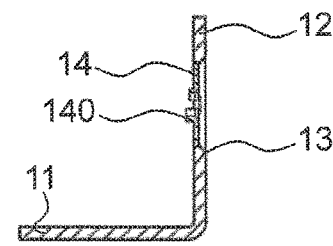
FIG. 41　　　　　　　　　　FIG. 42
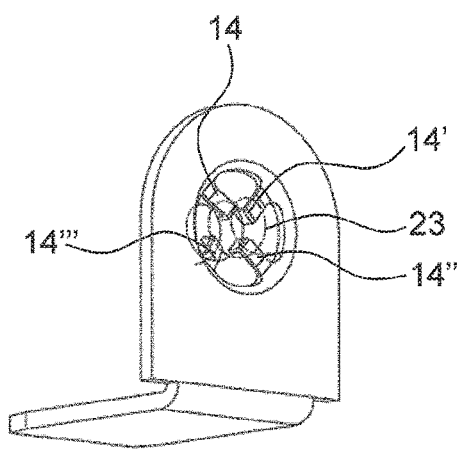
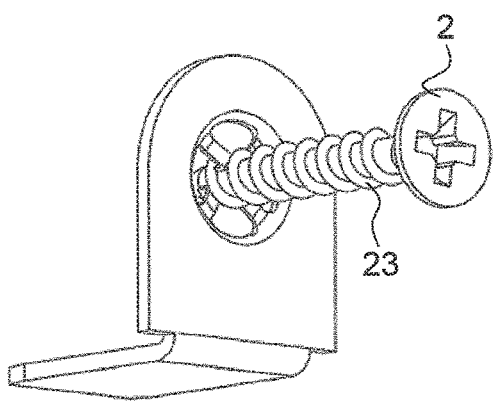
FIG. 43　　　　　　　　　　FIG. 44

SEALING DEVICE AND FASTENING MEANS

TECHNICAL FIELD

The present invention relates to a sealing device for a door or a window, to a fastening means of such a drop-down seal and to an insert element of such a fastening means.

PRIOR ART

Manually or automatically actuable drop-down seals for doors or windows are usually arranged in a groove of a door leaf or window casement, or on an end side, and screwed on by way of an angled fastening bracket. This is disclosed, for example, in EP 1 122 394. U.S. Pat. No. 2,066,188 discloses a drop-down seal with a fastening plate.

Furthermore, EP 1 772 586 discloses an angled fastening bracket which is intended to improve mechanical fitting. Said angled fastening bracket is arranged in captive fashion in the housing rail.

EP 1 748 142 discloses an angled retaining bracket with a magnet arranged behind it, wherein a fastening screw passes through both the angled retaining bracket and the magnet.

EP 2 305 938 discloses a retaining element with a countersinkable screw.

DESCRIPTION OF THE INVENTION

It is an object of the invention to provide a sealing device, in particular a drop-down seal, which is straightforward to fit, in particular even by hand.

The sealing device according to the invention for a door or window has a housing rail and a sealing strip, which is retained in the housing rail. The sealing device also has at least one fastening means for fastening the housing rail on a door leaf or window casement, wherein the fastening means comprises a plate for resting on an end surface of the door leaf or window casement and also comprises a through-opening for a screw, said through-opening being arranged in the plate. According to the invention, a restraining means for retaining the screw is present in the through-opening.

This makes it possible for the screw to be pre-fitted. Use can be made, for this purpose, of commercially available screws, in particular wood screws. The operation of fitting the seal on the door leaf or window casement is simplified since it is no longer necessary for the screw to be held by hand. The fitter can use one hand to hold the (cordless) screwdriver and use the other hand to hold the seal, and possibly also the fastening means. This therefore makes it possible for the seal to be fitted, and fastened, in the door leaf using one hand.

Doors in this text are also understood to cover a gate, in particular a sliding gate. The seal is preferably a drop-down seal with a sealing strip which can be raised and lowered relative to the housing rail. However, it may also be, for example, a slide seal.

The restraining means preferably has at least one arm or is formed by at least one arm, which retains the screw. Said arm is arranged in the through-opening. This design is relatively cost-effective.

It is preferable for at least three, more preferably precisely three, arms to be present, said arms being arranged in the through-opening in a manner distributed over the circumference of the same. They are directed preferably radially toward a center point of the through-opening. The screw can thus be retained in an already pre-centered manner in the through-hole and incorrect orientation in the radial direction during fitting is not really possible any longer.

In other embodiments, precisely four arms are present. This is advantageous, in particular, when the restraining means, in particular the arms with restraining fingers, are to engage in the thread turns in an offset manner along the length of the screw. The screw can thus be retained without wobbling. As an alternative, or in addition, it can be retained in a state in which it is already oriented in the manner necessary for definitive fitting. This orientation runs usually parallel to the longitudinal direction of the housing rail.

The at least one arm preferably runs in a plane defined by the through-opening.

The at least one arm is preferably of bendable design such that it can be bent out of the through-opening when the screw is being screwed in. The screw can thus be countersunk in alignment with the surface of the plate in the door leaf or window casement. In addition, the at least one arm does not break off, and it is therefore also the case that it is not possible for any problematic small parts to remain in the seal or to scratch, or damage in any other way, any floor coverings such as parquet.

In one embodiment, the screw is retained in the through-opening at right angles to the plate. In another embodiment, the screw is retained at an angle other than 90° in relation to the plate. This can be achieved by at least one arm having a bent restraining finger.

In a straightforward embodiment, the restraining means is produced together in one piece with the plate and preferably in one piece with the fastening means as a whole. The fastening means is preferably a work piece punched from a metal, for example steel, a plastics injection molding or a zinc die casting. If the restraining means is formed in one piece with the plate, or even in one piece with the fastening means as a whole, then it consists preferably of the same material as the plate, in particular of metal or plastics material.

In other embodiments, the fastening means is produced from a first material, preferably from metal, and the restraining means is produced from a second material, preferably from a plastics material. The restraining means made of plastics material, in one embodiment, is applied to the plate or the fastening means by injection molding.

In another embodiment, the restraining means is an insert element which can be fixed in the through-opening. The restraining means is produced preferably from plastics material or metal. The fastening means, in this exemplary embodiment, is produced preferably from a metal, in particular steel. In this embodiment, it is possible for the insert element to be applied to the screw by injection molding or to be produced in the form of a separate component.

In preferred embodiments, the screw is retained in a fixed state by means of a droplet of adhesive. This is an extremely straightforward and cost-effective fixing method, in particular when the restraining means is formed in one piece with the plate and/or when the restraining means and the plate are produced from metal.

In a preferred embodiment, the entire angled retaining bracket is produced from plastics material, the bracket having the restraining means in its accommodating opening. It is possible for the restraining means to be formed in one piece with the rest of the angled retaining bracket or to be designed in the form of an insert element. The restraining means may be formed, for example, by the aforementioned at least one arm, preferably by three or four arms.

In another embodiment, the angled retaining bracket made of plastics material has a retaining ring, which encloses the screw and thus forms the restraining means. The retaining ring, or even the angled retaining bracket as a whole, can be applied to the screw by injection molding or produced in the form of a separate component. The angled retaining bracket may be formed in more than one piece, e.g. the retaining ring may be designed in the form of an insert element. It is preferably the case, however, that said angled retaining bracket is also formed in one piece.

If the fastening means, restraining means and screw are present in the form of three separate parts, then it is the case during fitting, depending on the embodiment, that the fastening means and restraining means first of all form a unit, into which the screw is fitted, or the restraining means is fastened first of all onto the screw, before the two are introduced together into the through-opening of the fastening means.

In preferred embodiments, the housing rail has a u-shaped cross section with two side walls and an upper crosspiece, which connects the two side walls to one another. The plate of the fastening means runs preferably at an angle of 90° or greater in relation to the crosspiece. If the fastening means is an angled retaining bracket, then the plate is formed by one limb of the angled bracket and a second limb of the angled retaining bracket runs at an angle of 90° or greater in relation to the plate.

If the angle is greater than 90°, then this facilitates automatic or semiautomatic mechanical fitting of the seal in a door leaf or window casement. It is possible for the seal, with fastening means pre-fitted, to be pushed into the door groove more easily than in the case of an angle of precisely 90°. The plate is then bent into a right angle in relation to the crosspiece by virtue of the screw being screwed tightly in the end surface of the door leaf or window casement. The angle of greater than 90° has, in addition, the advantage that, with the screw pre-fitted, the second limb can already be pushed all the way into the housing rail and need no longer be displaced relative to the housing rail when the screw is being screwed into the door leaf.

In one embodiment, the fastening means is formed in one piece with the housing rail or is fixed, e.g. welded or adhesively bonded, thereto. It is also possible, however, for it to be designed in the form of a separate component.

In preferred embodiments, the fastening means is a separate angled retaining bracket with a first and a second limb, wherein the first limb forms the plate with the through-opening and the second limb can be pushed onto the housing rail beneath the crosspiece. As a result, the fastening means can easily be produced separately from the seal. In addition, there are no further elements necessary for connecting the seal to the fastening element. The seal is preferably provided with such a fastening means at its two ends. However, arrangement of said fastening means at one end, and of an alternative retaining means at the other end, of the seal is also possible.

The second limb is preferably of such a length that it projects beyond the free end of the pre-fitted screw, and therefore the angled retaining bracket pushed into the housing rail is retained in the latter. This makes it easier for the angled retaining bracket to be fastened on the door leaf using one hand, and therefore facilitates the fitting of the seal.

At least one restraining element is preferably present on the second limb, said restraining element acting as a brake to prevent the angled retaining bracket from falling out of the housing rail. The restraining element may be a resilient tongue, an elevation and/or depression and/or a widened portion of the second limb or an alternative means. The restraining element preferably acts merely as a brake, and therefore the angled retaining bracket, even in the case of the housing rail running in the vertical direction, i.e. in the case of "overhead fitting", does not fall out of the rail, although it is still the case that it can be pulled out of the rail without any greater amount of force having to be applied by hand. Said brake preferably forms merely a force fit with the housing rail. In alternative embodiments, however, the restraining means is designed such that the angled retaining bracket is retained in the housing rail and can be removed again only with the use of a tool or by a relatively large amount of force being applied by hand. In this case, the restraining means preferably forms a force fit and form fit with the housing rail.

In one embodiment according to the invention, the fastening means is an angled retaining bracket with a first and a second limb, wherein the first limb forms a plate for resting on an end surface of a door leaf or window casement and has a through-opening for a screw, wherein the restraining means for retaining the screw is present in the through-opening. The restraining means preferably has at least one arm, which is arranged in the through-opening.

In one embodiment according to the invention, the insert element has an annular main body with a hole, wherein the hole forms the through-opening for the screw, and wherein at least one arm is arranged in said hole for the purpose of retaining the screw.

The aforementioned embodiments can be combined with one another. Further embodiments are specified in the dependent claims.

BRIEF DESCRIPTION OF THE DRAWINGS

Preferred embodiments of the invention will be described hereinbelow with reference to the drawings, which serve merely for explanatory purposes and should not be interpreted as being restrictive. In the drawings:

FIG. 39 shows a perspective view of a seventh embodiment of an angled retaining bracket according to the invention;

FIG. 40 shows a further perspective view of the angled retaining bracket according to FIG. 39;

FIG. 41 shows a front view of the angled retaining bracket according to FIG. 39;

FIG. 42 shows a longitudinal section through the angled retaining bracket according to FIG. 39;

FIG. 43 shows a perspective view of an eighth embodiment of an angled retaining bracket according to the invention;

FIG. 44 shows the perspective view of the angled retaining bracket according to FIG. 43 with a screw pre-fitted;

DESCRIPTION OF PREFERRED EMBODIMENTS

Figure 1:
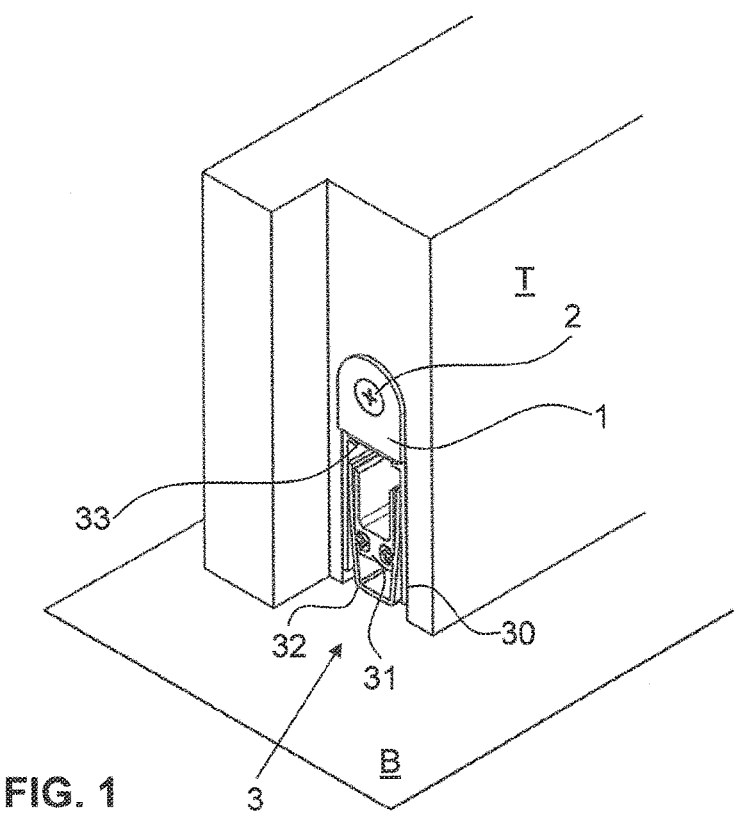
FIG. 1 shows a perspective illustration of a door leaf with a drop-down seal fitted.

FIG. 1 shows a door leaf T with a groove in its lower end side. A drop-down seal 3 of a known type is incorporated in said groove and is fastened on the lateral end surface of the door, via an angled fastening bracket 1, using a screw 2.

The drop-down seal 3 illustrated here has a u-shaped housing rail 30, which is open in the downward direction and in which is arranged a sealing strip, i.e. a carrier strip 31 with a sealing element 32. The carrier strip 31 can be raised and lowered relative to the housing rail 30, a mechanism which cannot be seen in the figures being present in the housing rail 30 for this purpose. In the lowered state, the sealing element 32 provides sealing in relation to a floor B.

The triggering of the seal and thus the raising and lowering operations take place usually via an actuating rod which projects from one end side of the seal and, when the door leaf is being closed, strikes against the door frame and is pushed in, the mechanism therefore being activated for lowering purposes. When the door leaf is being opened, the actuating rod is relieved of loading and the sealing strip is raised again by way of restoring springs.

The seal can also be triggered in other ways, for example manually or by motor-driven or magnetic means. It is also possible for the seal to be a slide seal, which is therefore not lowered when the door is being closed. It is likewise possible for the sealing element 32 to be in a form other than that presented here.

FIGS. 2 to 12 show a first exemplary embodiment of the angled retaining bracket 1 according to the invention. The angled retaining bracket 1 has a first limb 10 for butting against the end side of the door leaf T and a second limb 11, which can be pushed into a groove 33 (see FIG. 1) of the housing rail 30. In order to facilitate introduction, the second limb 11 has an introduction means 100 in the form of an oblique edge at its free end. The first limb 10 forms a plate.

The angled retaining bracket 1 is produced preferably from a metal, in particular steel. It is formed in one piece. The two limbs 10, 11 are of preferably planar design.

The first limb 10 has a through-opening 12 for the screw 2. It is also possible for more than one such opening to be present, in which case preferably all the openings are designed according to the invention as described hereinbelow.

The through-opening 12 has an encircling countersink 13 in the form of an oblique surface in which a screw head can be countersunk. Also present in the through-opening 12 are three arms 14, which project radially inward toward the center point of the opening 12. These arms are nevertheless preferably shorter than the radius, and they therefore do not extend as far as the center point. It is also possible for fewer or more than these three arms 14 to be present. The arms 14 are aligned preferably with the rear side of the first limb 10. The rear side is directed toward the free end of the second limb 11 and/or, in the fitted state, toward the lateral end surface of the door leaf T. The arms 14 have their opposite surfaces aligned preferably with the base of the encircling countersink 13, the base being adjacent to said rear side. The arms 14 are preferably designed to have thinner walls than the first limb 10. As a result, or on account of some other configuration, they are preferably bendable. The bending capability can be increased, in addition, by recesses 15 in the circumference of the through-opening 12, said recesses being adjacent to the arms 14. In this example, the arms 14 are produced from the same material as the rest of the angled retaining bracket 1 and form, as restraining means, part of the single-piece angled retaining bracket 1.

Figure 5:
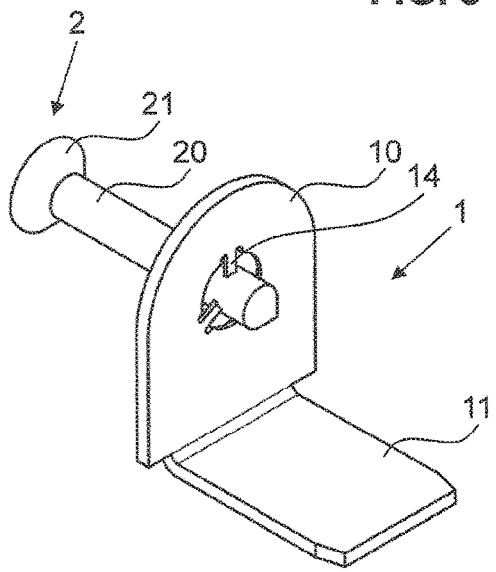
FIG. 5 shows a perspective view of the angled retaining bracket according to FIG. 2 with a screw pre-fitted.
Figure 6:
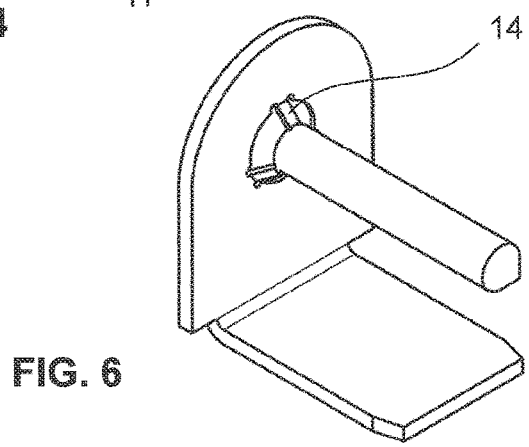
FIG. 6 shows a perspective view of the angled retaining bracket according to FIG. 2 with a screw fitted in a door leaf, the door leaf not being illustrated.
Figure 7:
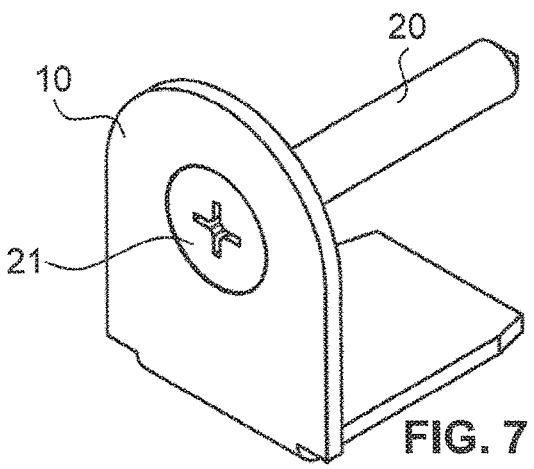
FIG. 7 shows a further perspective view of the angled retaining bracket according to FIG. 2 with a screw fitted in a door leaf, the door leaf not being illustrated.
Figure 8:
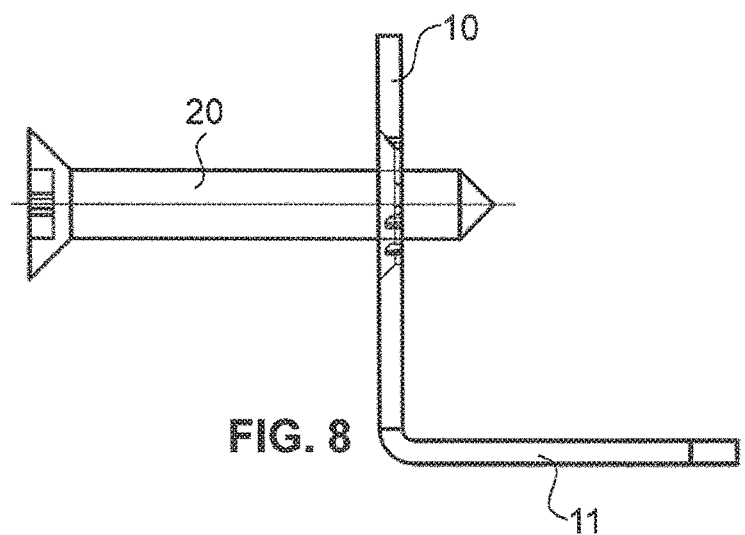
FIG. 8 shows a side view of the angled retaining bracket according to FIG. 2 with a screw pre-fitted.
Figure 9:
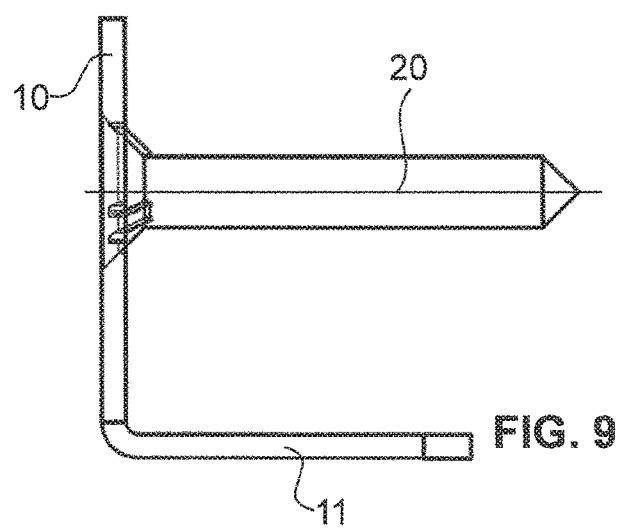
FIG. 9 shows a side view of the angled retaining bracket according to FIG. 2 with a screw fitted in a door leaf, the door leaf not being illustrated.

In FIGS. 5 and 8, the screw 2 has its shank 20 passing through the opening 12 of the angled retaining bracket and is retained in said position by virtue of the arms 14. The screw shank 20 here extends more or less, or preferably precisely, perpendicularly to the plate, i.e. to the first limb 10. In figures FIGS. 6, 7 and 9, the screw 2 has been screwed all the way into the door leaf, the door leaf T itself not being illustrated. The screw head 2 is aligned with the outer surface of the first limb 10. The arms 14 are bent inward or toward the rear side and butt preferably an encircling oblique surface of the screw head 21. The arms 14 are preferably pushed into the wood of the door leaf T. In this example, the screw 2 is longer than the second limb.

Figure 10:
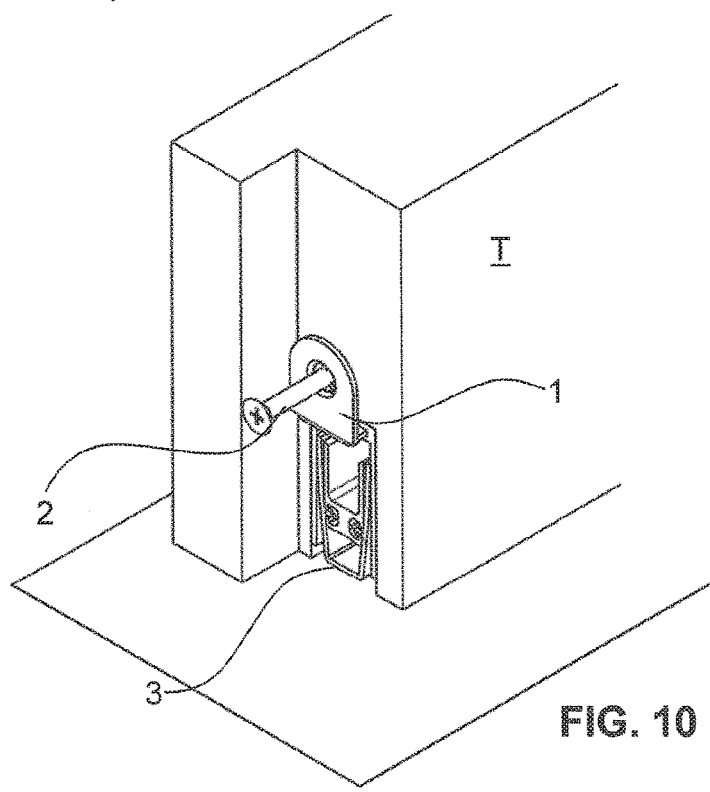
FIG. 10 shows a perspective illustration of the door leaf with drop-down seal according to FIG. 1, with the angled retaining bracket pre-fitted.
Figure 2:
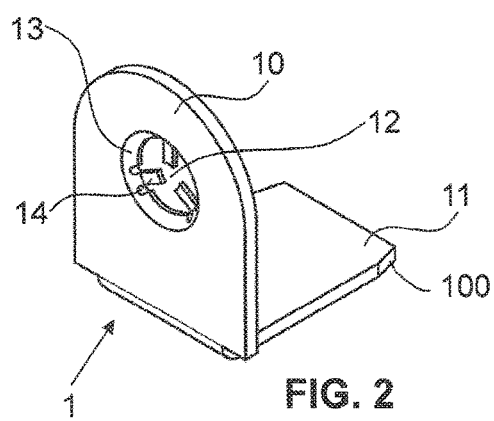
FIG. 2 shows a perspective illustration of a first embodiment of an angled retaining bracket according to the invention.
Figure 3:
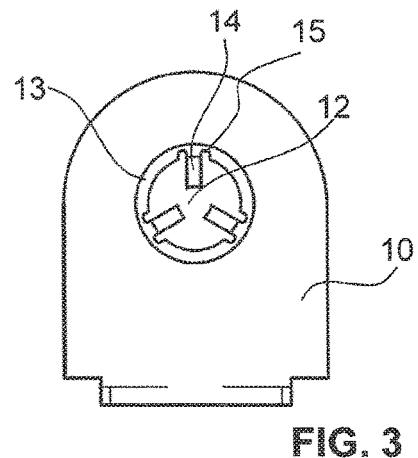
FIG. 3 shows a view of the angled retaining bracket according to FIG. 2 as seen from the front.
Figure 4:
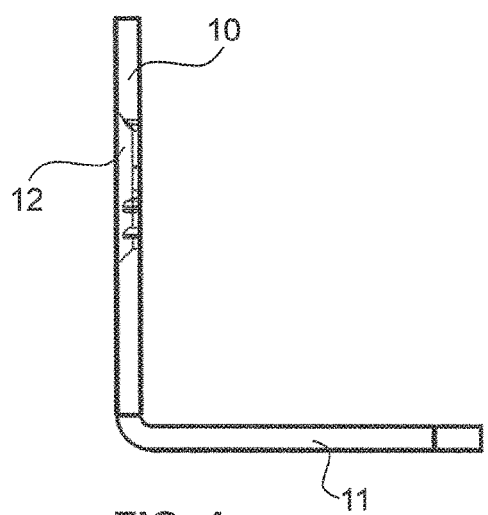
FIG. 4 shows a side view of the angled retaining bracket according to FIG. 2.

FIG. 10 illustrates the seal in the pre-fitted state. The seal is already located in the door groove and is already provided with the angled element 1. The screw 2 is retained in the angled element 1 and cannot fall out. However, it has not yet been screwed in.

Figure 11:
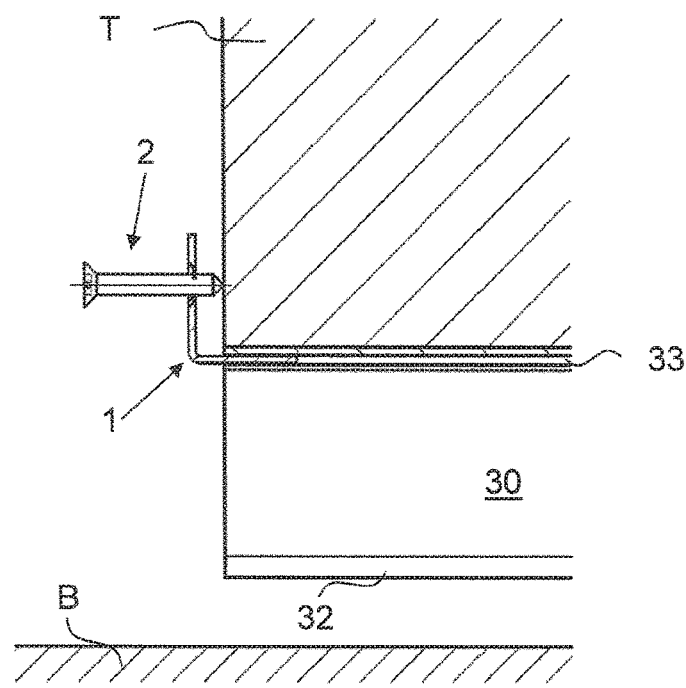
FIG. 11 shows a longitudinal section through the door leaf according to FIG. 1 with the angled retaining bracket pre-fitted.
Figure 12:
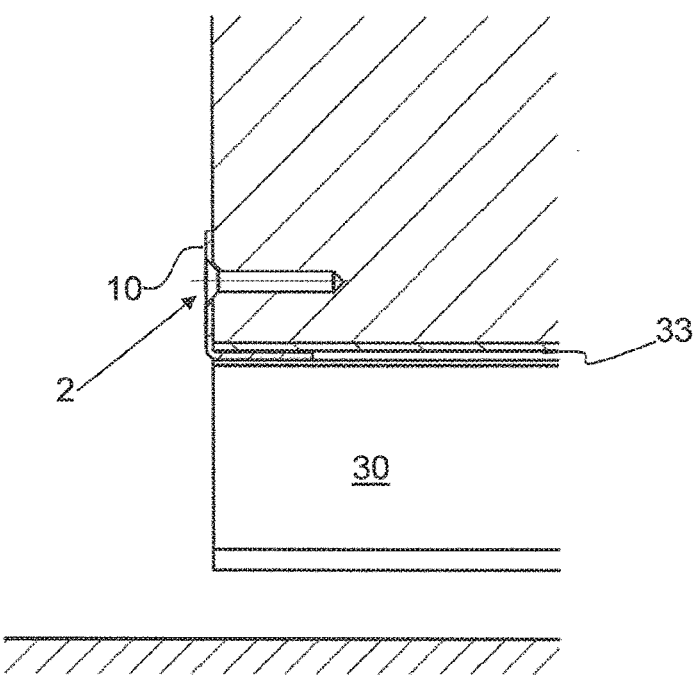
FIG. 12 shows a longitudinal section through the door leaf according to FIG. 1 with the angled retaining bracket fitted.
Figure 13:
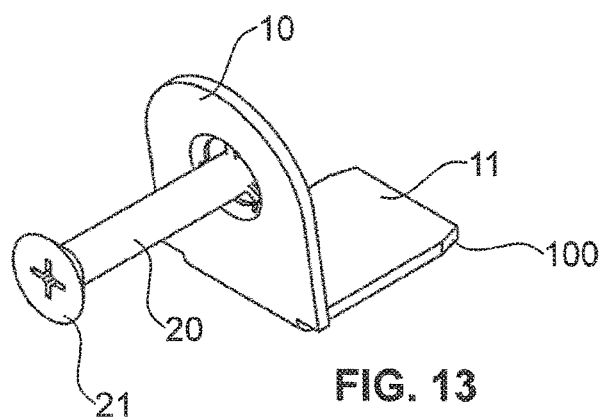
FIG. 13 shows a perspective illustration of a second embodiment according to the invention of an angled retaining bracket according to the invention with a screw pre-fitted.
Figure 14:
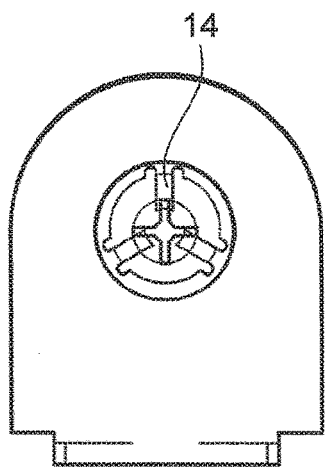
FIG. 14 shows a front view of the angled retaining bracket according to FIG. 13.

As can be seen in FIG. 11, the screw 2 is guided through the angled retaining bracket 1 and is retained in a position perpendicular to the end surface of the door leaf. It can then be screwed in with one hand until the angled retaining bracket 1 butts against the end surface of the door leaf and the seal is fixed in the door. This illustrated in FIG. 12.

Yet more exemplary embodiments will be explained hereinbelow. What has been said above, in particular the variants specified above, also applies to these exemplary embodiments.

FIGS. 13 to 21 illustrate a second exemplary embodiment of an angled retaining bracket according to the invention. In this case, the first and second limbs 10, 11 do not, as in the first example, form a right angle. Rather, the angle is greater than 90°.

Figure 15:
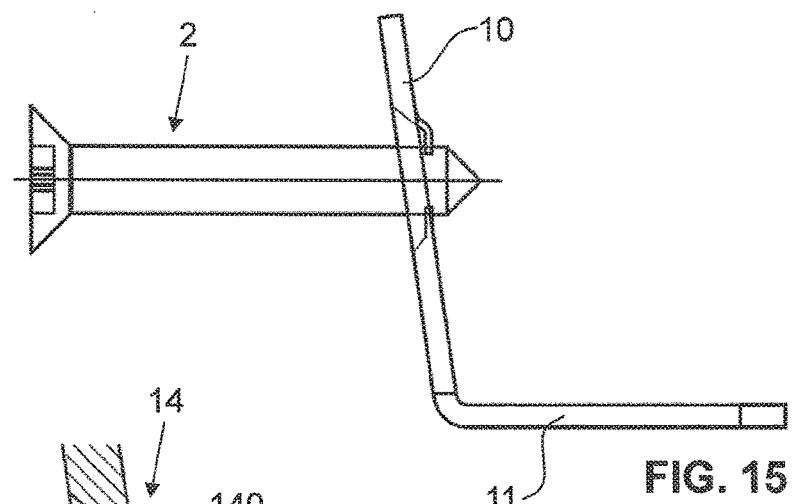
FIG. 15 shows a side view of the angled retaining bracket according to FIG. 13.
Figure 16:
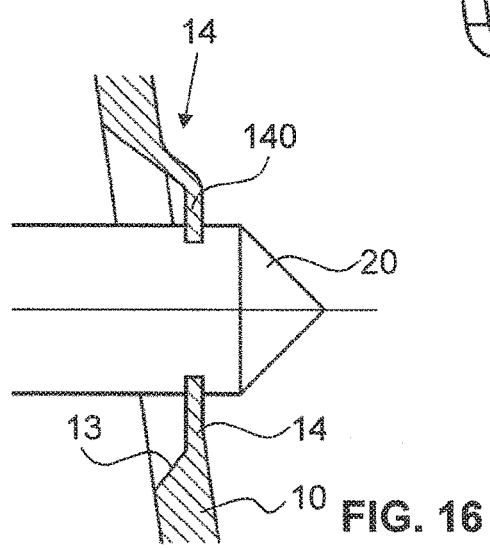
FIG. 16 shows a longitudinal section through an enlarged detail according to FIG. 15.
Figure 20:
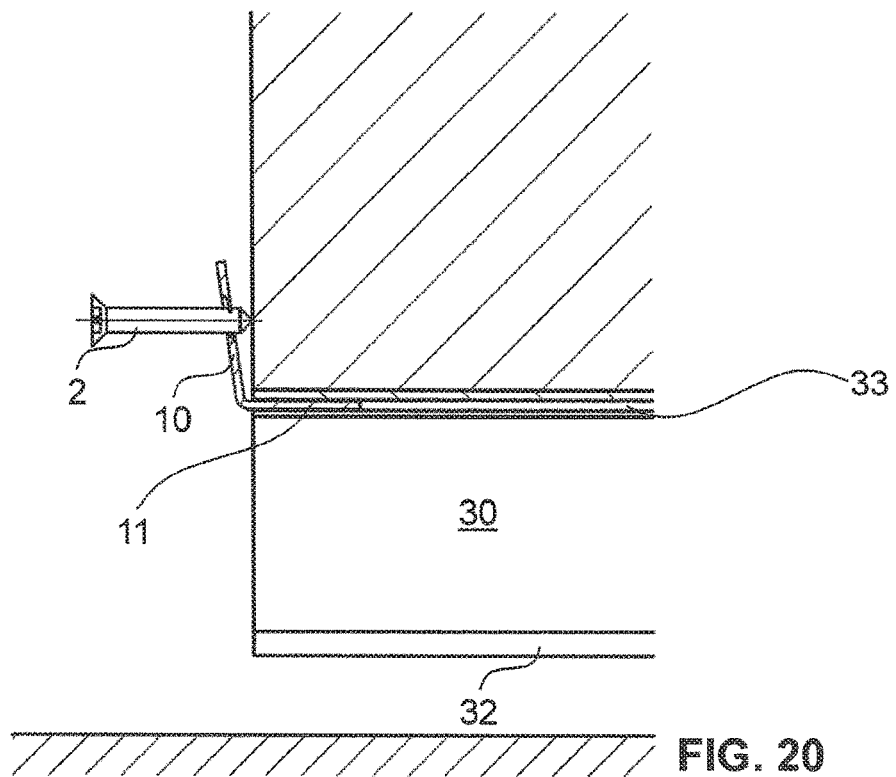
FIG. 20 shows a longitudinal section through the door leaf with drop-down seal and angled retaining bracket according to FIG. 19.

The screw 2, however, is nevertheless retained preferably parallel to the second limb 11 and cannot fall out, as can be seen to good effect in FIGS. 15 and 20. For this purpose, at least one arm 14, preferably the arm or arms 14 located in the upper half of the through-opening 12, is of angled design. It has, for example, a restraining finger 140. This restraining finger 140 runs at an angle to the rest of the arm 14 and forms the free end of the arm 14. The arms 14 located in the lower half of the opening 12 preferably have no such restraining finger 140; rather, as in the first example, they are of rectilinear design. As illustrated in FIG. 16, they project, preferably at an angle, beyond the rear side of the first limb 10.

By virtue of this right-angled arrangement of the screw 2, the angled retaining bracket, once again, can be pre-fitted in the seal such that it cannot fall out, and it can be screwed on the door leaf with one hand. There is no need for the angled retaining bracket 1, when the screw is being screwed in, to be held additionally by hand. Also, there is no need for the screw 2 to be positioned at an angle.

This embodiment has, in addition, the advantage that the second limb 11 can be pushed all the way into the housing rail 3 as early as the pre-fitting state and there is therefore no longer any need for the angled retaining bracket 1 to be displaced relative to the housing rail 3 when being screw-fitted on the door leaf.

Figure 17:
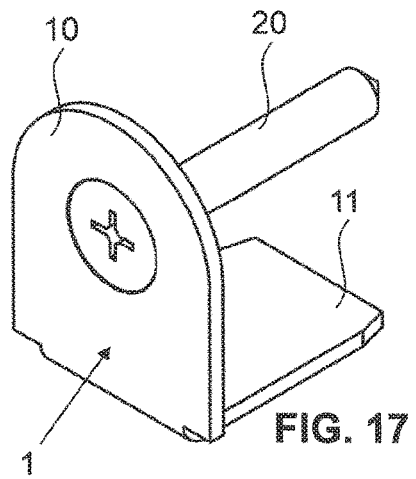
FIG. 17 shows a perspective illustration of the angled retaining bracket according to FIG. 13 in the fitted state, although the door leaf and the seal are not illustrated.
Figure 18:
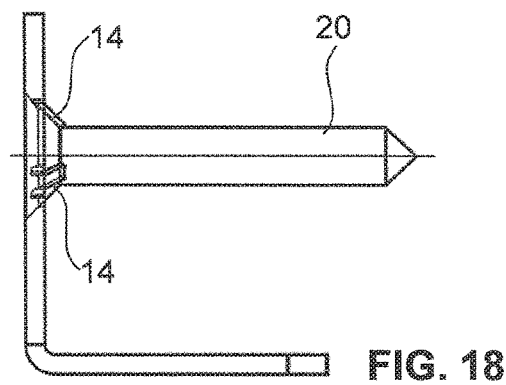
FIG. 18 shows a side view of the angled retaining bracket according to FIG. 17 in the fitted state.
Figure 19:
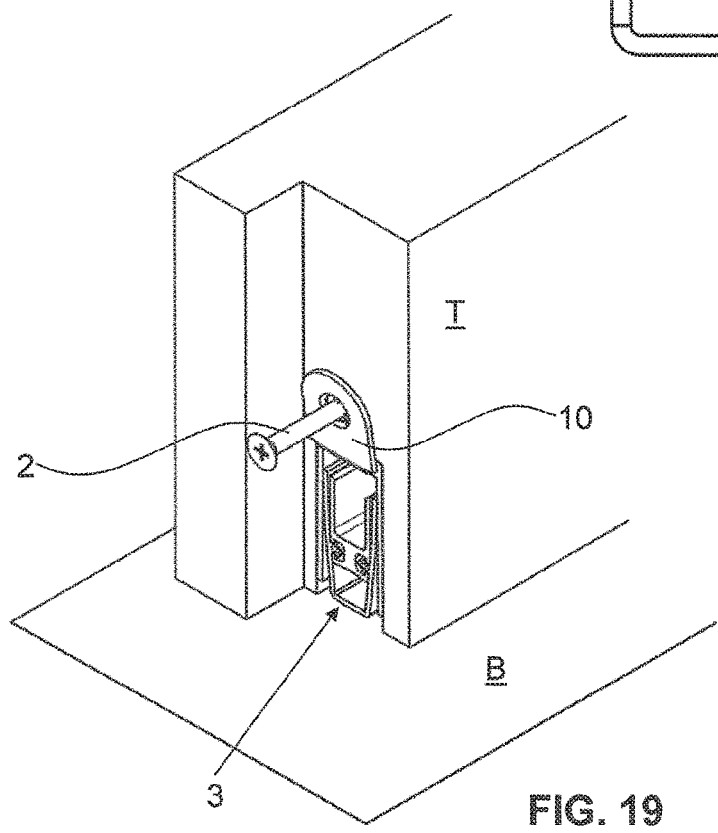
FIG. 19 shows a perspective illustration of the door leaf with drop-down seal with an angled retaining bracket according to FIG. 13 pre-fitted.
Figure 21:
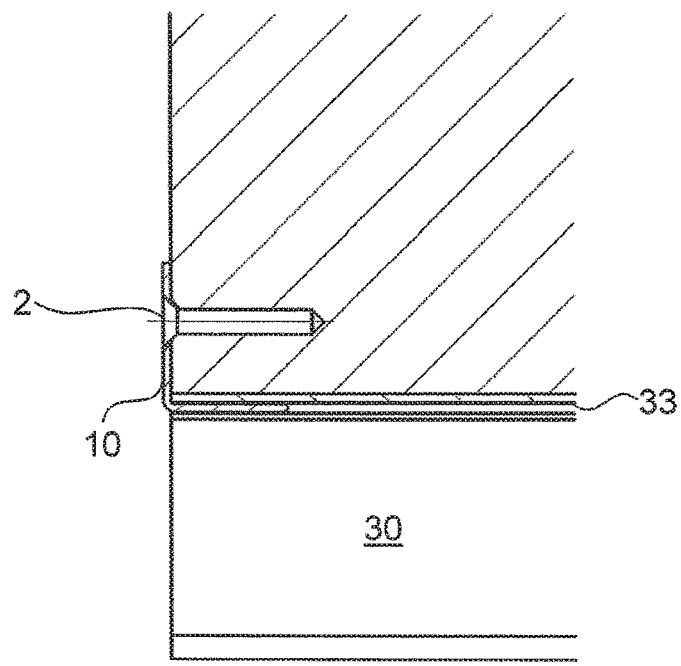
FIG. 21 shows the longitudinal section according to FIG. 20 in the fitted state.

For the screwing-in operation, the first limb 10 bends toward the end surface of the door or toward the second limb 11, until the two limbs 10, 11 form a right angle. This is illustrated in FIGS. 17, 18 and 21.

Figure 22:
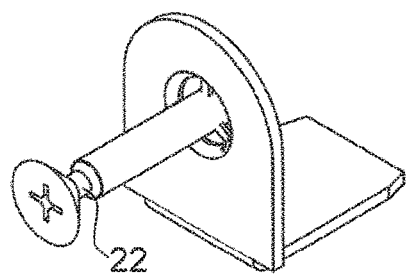
FIG. 22 shows a perspective illustration of a third embodiment according to the invention of an angled retaining bracket according to the invention with a screw pre-fitted.
Figure 23:
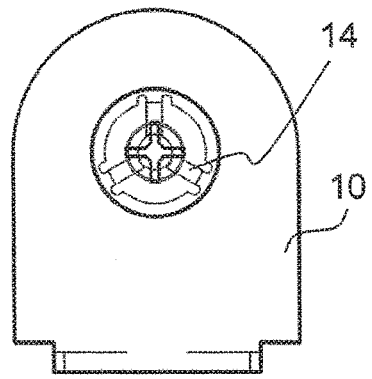
FIG. 23 shows a front view of the angled retaining bracket according to FIG. 22.
Figure 25:
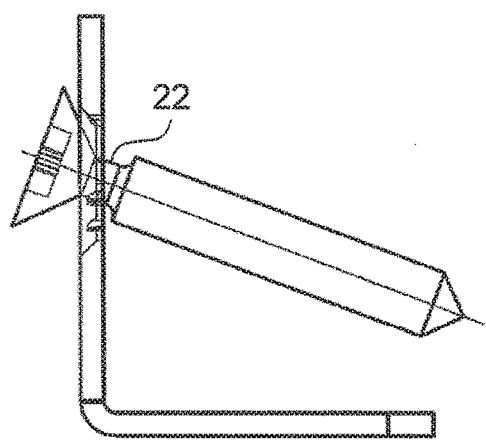
FIG. 25 shows a side view of the angled retaining bracket according to FIG. 22 following a removal operation.
Figure 24:
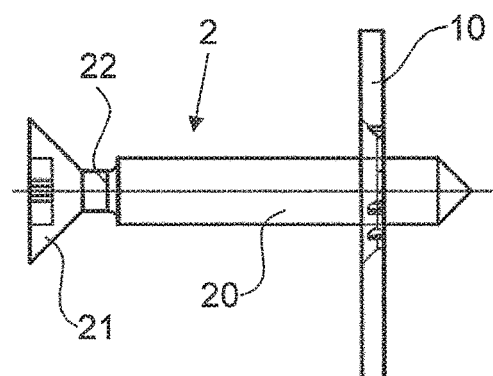
FIG. 24 shows a side view of the angled retaining bracket according to FIG. 22 in the pre-fitted state.
Figure 26:
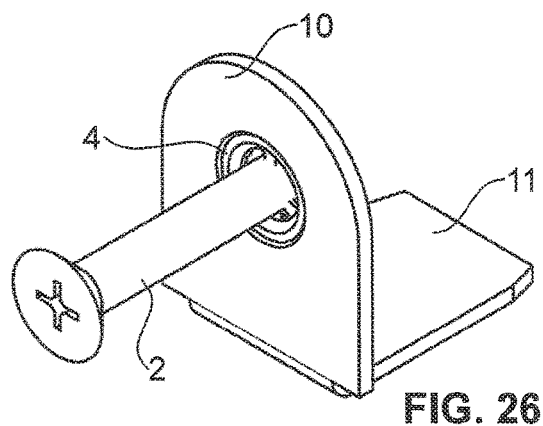
FIG. 26 shows a perspective illustration of a fourth embodiment according to the invention of an angled retaining bracket with insert element according to the invention with a screw pre-fitted.
Figure 27:
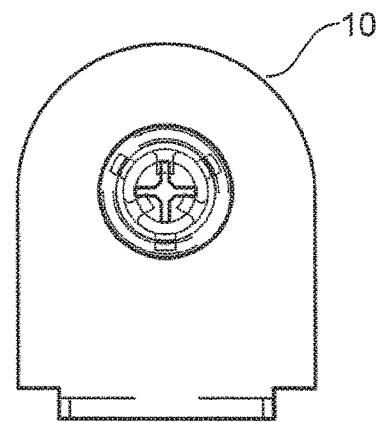
FIG. 27 shows a front view of the angled retaining bracket according to FIG. 26.

FIGS. 22 to 25 show a further exemplary embodiment. The screw has a narrowing 22 between the shank 20 and head 21. It is therefore a known type of captive screw. As illustrated in FIGS. 22 and 24, it is pre-fitted in the same position as the screws described above. If the retaining bracket 1 is removed from the door leaf T, and the retaining bracket 1 is pulled out of the housing rail 3, then the screw 2 remains in the angled retaining bracket 1, as can be seen in FIG. 25.

Figure 28:
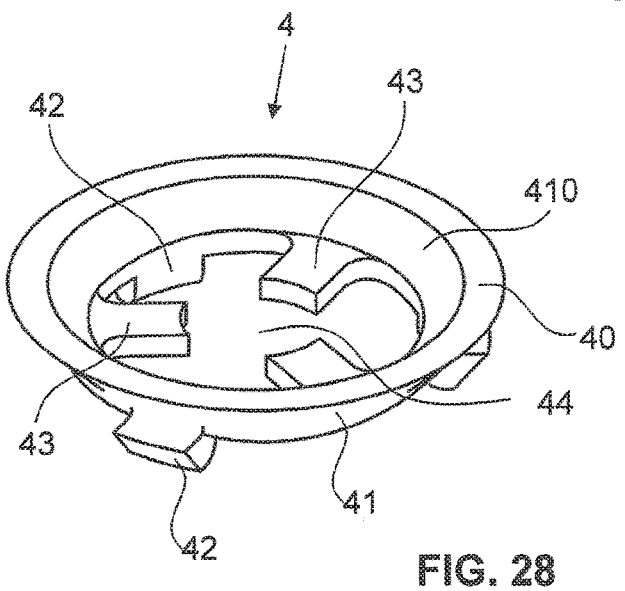
FIG. 28 shows a perspective illustration of the insert element according to FIG. 26.
Figure 29:
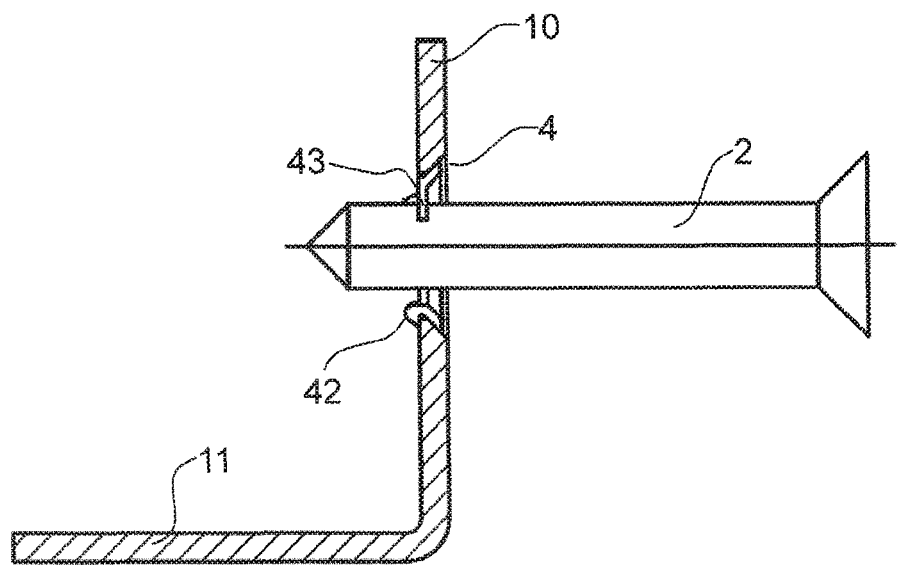
FIG. 29 shows a longitudinal section through the angled retaining bracket according to FIG. 26.
Figure 30:
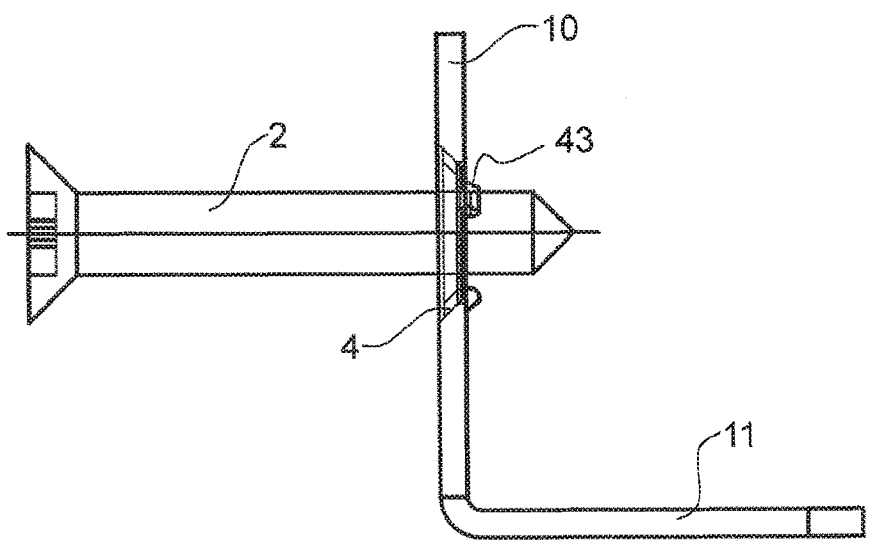
FIG. 30 shows a side view of the angled retaining bracket according to FIG. 26.
Figure 31:
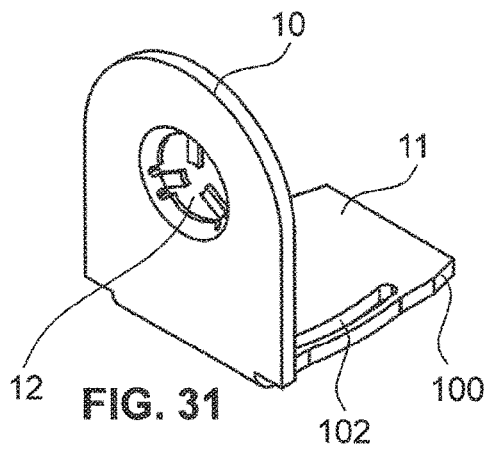
FIG. 31 shows a perspective illustration of a fifth embodiment according to the invention of an angled retaining bracket according to the invention.
Figure 32:
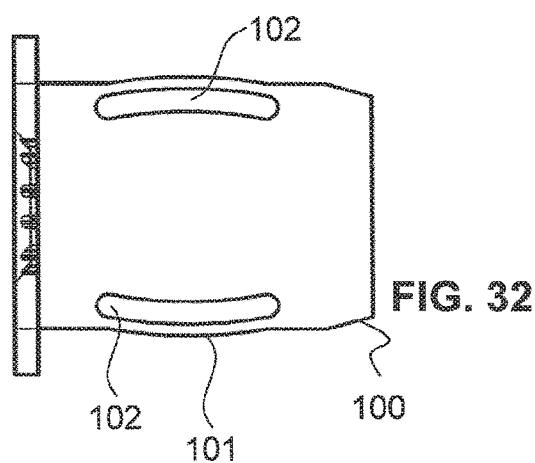
FIG. 32 shows a plan view of the angled retaining bracket according to FIG. 31.
Figure 33:
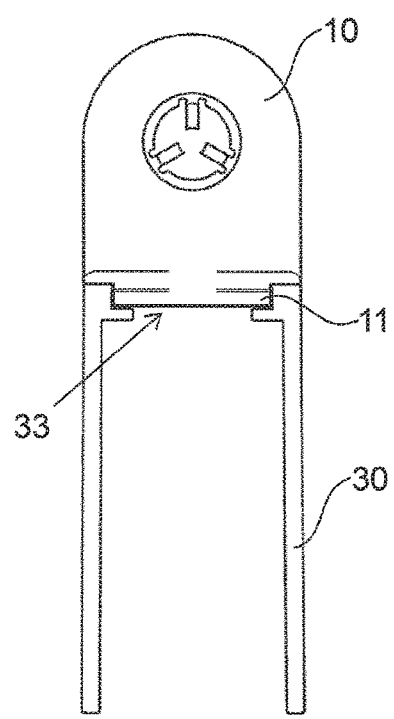
FIG. 33 shows a front view of the angled retaining bracket according to FIG. 31 introduced into a housing rail of a drop-down seal.

In the exemplary embodiments described up until now, the arms 14 formed a restraining means which is in one piece with the rest of the angled retaining bracket 1. In the exemplary embodiment according to FIGS. 26 to 30, the restraining means is an insert element 4, which is retained in the opening 12. It is retained preferably in captive fashion therein. Said insert element 4 can be seen to good effect in FIG. 28. It has a circular main body 41 with an encircling flange 40 and a through-opening 44. The main body 41 forms on its inner side, i.e. as a circumference of the opening 44, a beveled surface or an encircling countersink 410 in the form of an oblique surface for accommodating the screw head 21. Arms 43, directed once again radially forward the center point, are present at the end of said countersink 410 and retain the screw 2 in its pre-fitted position such that it cannot fall out. As can be seen in FIG. 28, the free ends of the arms 43 are preferably rounded and preferably set in adaptation to the circumference or thread of the screw shank 20. The same also applies to the other embodiments described above.

On its outer circumference the insert element 4 has restraining noses 42, which are distributed preferably over the circumference and project radially outward. They serve to retain the insert element 4 in the opening 12 of the first limb 10. The restraining noses 42 are designed preferably in the form of latch-in elements, as can be seen to good effect in FIG. 29.

The insert element 4 is produced preferably from plastics material or from metal. Either it is connected to the screw prior to the screw and angled retaining bracket being joined together or it is already retained in the angle retaining bracket, in particular fitted therein. It is produced from plastics material, but may also be applied directly to the screw 2 or the angled retaining bracket 1 by injection molding.

Figure 34:
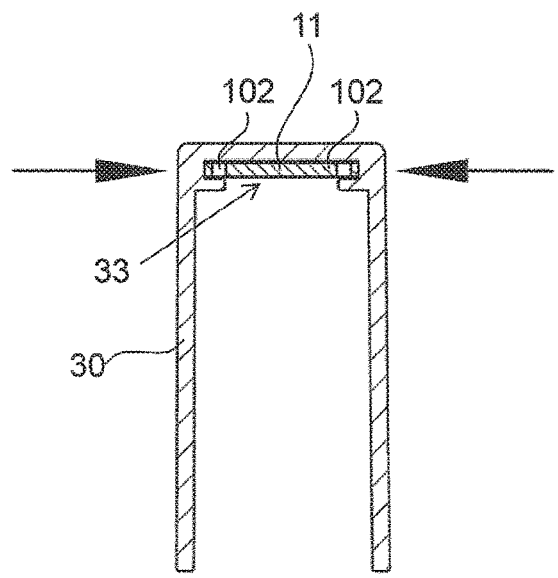
FIG. 34 shows a cross section through the arrangement according to FIG. 33.
Figure 35:
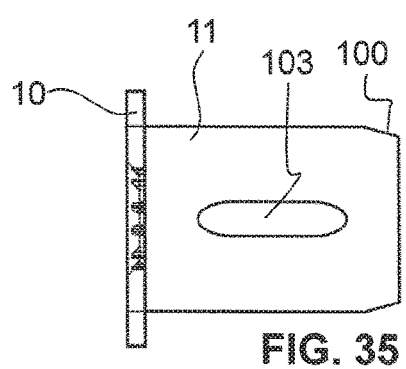
FIG. 35 shows a plan view of a sixth embodiment of an angled retaining bracket according to the invention.
Figure 36:
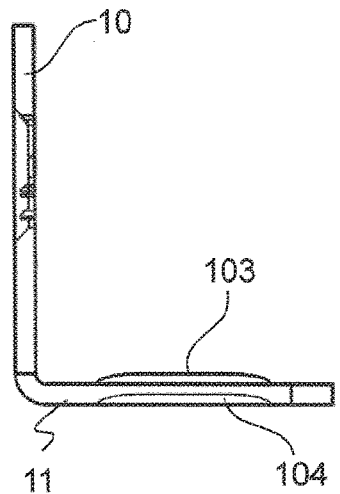
FIG. 36 shows a side view of the angled retaining bracket according to FIG. 35.
Figure 37:
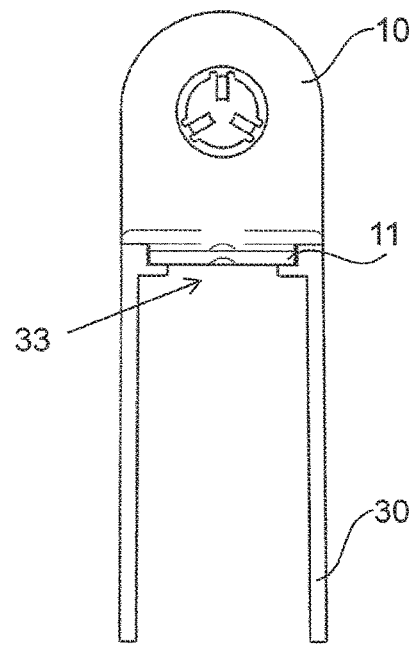
FIG. 37 shows a front view of the angled retaining bracket according to FIG. 35 introduced into a housing rail of a drop-down seal.
Figure 38:
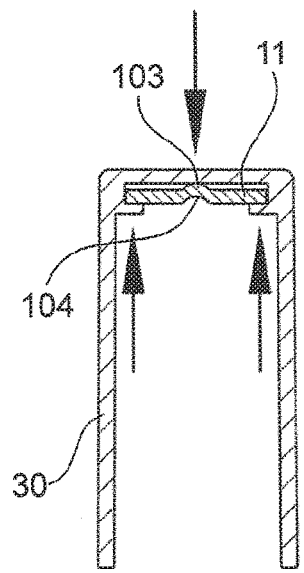
FIG. 38 shows a cross section through the arrangement according to FIG. 35.
Figure 45:
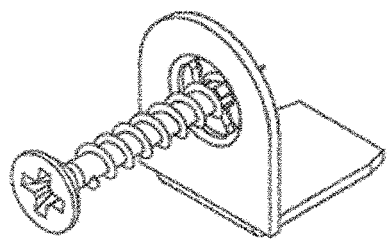
FIG. 45 shows a further perspective view of the angled retaining bracket according to FIG. 43 with a screw pre-fitted.
Figure 46:
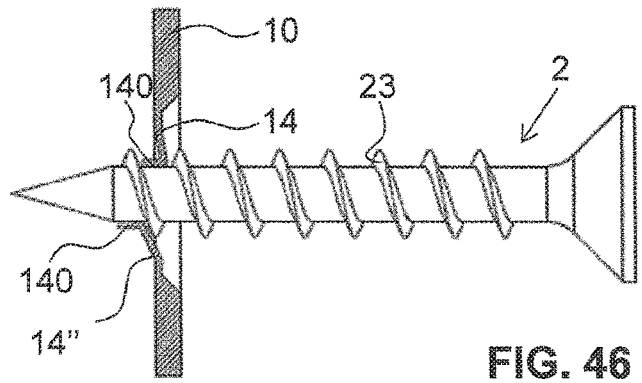
FIG. 46 shows a longitudinal section through part of the angled retaining bracket according to FIG. 43 with a screw pre-fitted.
Figure 47:
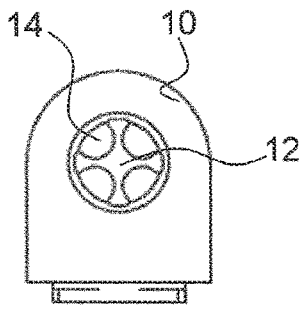
FIG. 47 shows a front view of a ninth embodiment of an angled retaining bracket according to the invention.
Figure 48:
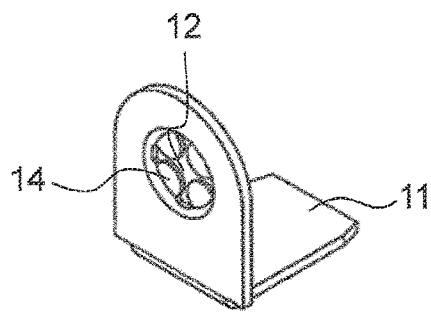
FIG. 48 shows a perspective view of the angled retaining bracket according to FIG. 47.
Figure 49:
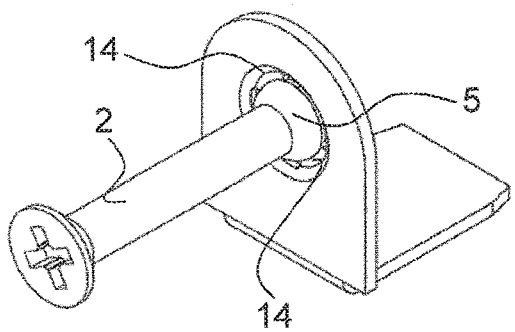
FIG. 49 shows the perspective view of the angled retaining bracket according to FIG. 47 with a screw pre-fitted and a droplet of adhesive.
Figure 50:
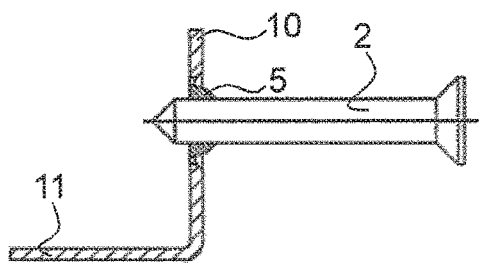
FIG. 50 shows a longitudinal section through the angled retaining bracket according to FIG. 47.
Figure 51:
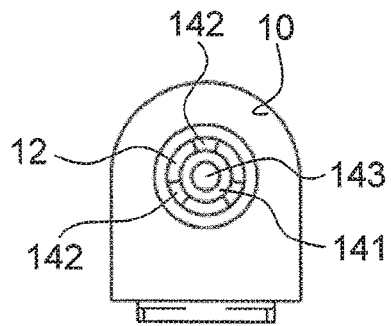
FIG. 51 shows a front view of a tenth embodiment of an angled retaining element according to the invention.
Figure 52:
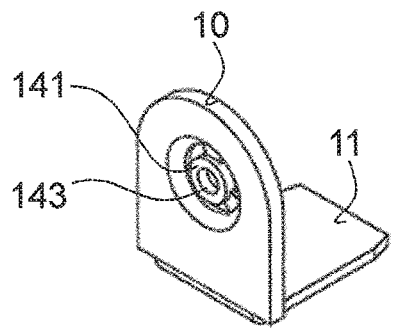
FIG. 52 shows a perspective view of the angled retaining bracket according to FIG. 51.
Figure 53:
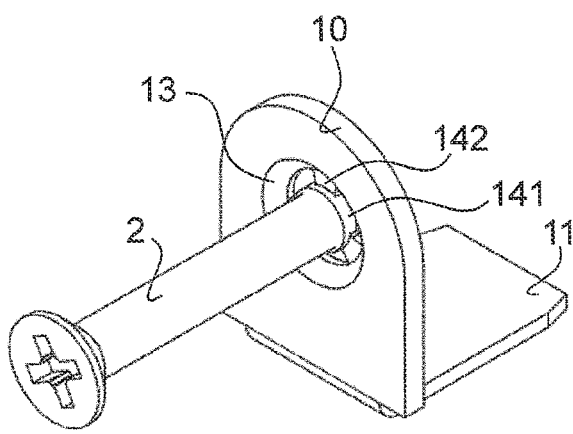
FIG. 53 shows the perspective view of the angled retaining bracket according to FIG. 51 with a screw pre-fitted.
Figure 54:
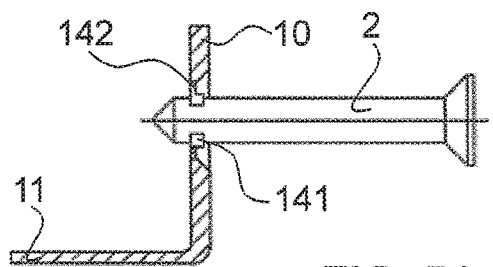
FIG. 54 shows a longitudinal section through the angled retaining bracket according to FIG. 51.

FIGS. 31 to 38 illustrate two variants of angled retaining brackets 1 according to the invention. These variants may be combined as desired with the exemplary embodiments above. In the embodiment according to FIGS. 31 to 34, the second limb 11 has, on either side, a convexity or widened portion 101 in the direction perpendicular to the first limb 10. A longitudinal slot 102 runs along the periphery in each case in the region of said widened portion 101. The longitudinal slot 102 is preferably curved. The second limb thus forms a brake to prevent the angled retaining bracket 1 from falling out of the housing rail 3. When the second limb 11 is being introduced into the groove 33 of the housing rail 3 (see FIG. 33), the second limb 11 is compressed in this region and the angled retaining bracket 1 is thus retained in the housing rail 3, albeit without already being fixed firmly thereto. This is illustrated in FIG. 34. However, it is preferably still the case that the angled retaining bracket 1 can be removed by hand without any great amount of force having to be applied. Depending on the embodiment of the restraining element, however, it is also possible for the application of relatively large forces, or a tool, to be necessary in order to separate the angled retaining bracket again from the housing rail.

In the embodiment according to FIGS. 35 to 38, the second limb 11 is provided with a bend in one region. This is preferably a longitudinal bend located preferably in the central region of the limb 11. The limb 11 thus has an elevation 103 and a depression 104. This also results in clamping forces taking effect following introduction into the groove 33, and in the angled retaining bracket 1 thus being retained in the housing rail 3 such that it cannot fall out. This can be seen in FIG. 38.

FIGS. 39 to 42 illustrate a further exemplary embodiment. Also present, once again, are arms 14, which are formed preferably in one piece with the first limb 10.

In this embodiment, the arms 14 or lugs are designed to be wider than in the variants described up until now. In this example, each arm is of semi-elliptical or semicircular shape. At their free ends, they form a common, more or less closed circumference of an opening 12, in which the screw 2 is accommodated. It is preferably the case, however, that the arms 14 do not come into contact at these free ends.

The free ends have angled restraining fingers 140. Two of these extend onto that side of the angled retaining bracket 1 which is directed toward the second limb 11. The other two restraining fingers 140 are bent onto that side of the angled retaining bracket 1 which is directed away from the second limb 11. It is preferable for in each case two adjacent restraining fingers 140 to be oriented in the same direction.

Each restraining finger 140 preferably forms more or less a right angle with the rest of the arm 14. Each arm 14 runs preferably more or less parallel to the first limb 10. It is preferably the case that that, with the exception of the direction of their restraining fingers 140, all of the arms 14 are identical in terms of shape and orientation. The arms 14 are distributed preferably uniformly over the inner circumference of the countersink 13. It is preferably the case that precisely four arms 14 are present, each of these having a restraining finger 140. The restraining fingers 140 here engage in the screw threads 23 preferably in an offset manner over the course of said screw thread.

It has been found that said arrangement fixes the screw 2 to better effect and the latter wobbles to a lesser extent in its pre-fitted position. In addition, the screw 2 can be retained automatically in a horizontal position, i.e. parallel to the second limb 11, even in the pre-fitted position, and there is therefore no longer any need for it to be oriented in position prior to being fitted definitively in the door.

FIGS. 43 to 46 likewise illustrate an embodiment in which the screw 2 is retained in optimal fashion in its pre-fitted position.

In this exemplary embodiment, the arms 14, 14', 14", 14''' are bent such that they have their restraining fingers 140 engaging in the screw thread 23 in an offset manner over the course of said screw thread. The arms 14, 14', 14", 14''' are, accordingly, bent differently. Their restraining fingers 140 all extend in the same direction, i.e. to the side which is directed toward the second limb 11.

The first arm 14 is of more or less right-angled design, part of the arm 14 being formed by the restraining finger 140. The adjacent, second arm 14' is of identical design or forms a second angle, which forms an oblique surface between the restraining finger 140 and the opposite end of the arm 14'. Said oblique surface here is inclined such that the restraining finger 140 of said second arm 14' projects further beyond the first limb 10 than the first restraining finger 140 of the first arm 14. It is also the case that the third arm 14" and the fourth arm 14''' have oblique surfaces which are directed such that the corresponding restraining fingers 140 each project to an even greater extent. This means that they follow the thread 23 of the screw 2, as can be seen to good effect in FIGS. 44 and 46.

The oblique surfaces may all be directed inward, that is to say to the side which is directed toward the second limb 11. It is also possible, however, for one or more oblique surfaces to be inclined outward, that is to say to that side of the first limb 10 which is located opposite the second limb 11.

FIGS. 47 to 50 illustrate a further embodiment in which wobbling of the pre-fitted screw 2 is prevented and/or, even in the pre-fitted state, the screw 2 is arranged in a fixed state in a position parallel to the second limb 11, said position being required for fitting purposes.

It is also the case in this example that the fingers 14 are of preferably planar design, wherein, once again, they are preferably of semi-elliptical or semi-circular shape. The restraining fingers 140 are present or absent, depending on the embodiment. There are no restraining fingers illustrated in the present figures. The screw 2 is retained in a fixed position the through-opening 12 of the first limb 10 by way of the droplet 5 of adhesive. When the screw 2 is being screwed in, its bond with the droplet 5 of adhesive is released by the screw thread and the screw 2 can be displaced relative to the angled retaining bracket 1.

FIGS. 51 to 54 illustrate a further exemplary embodiment. The latter has the advantage that it is straightforward and cost-effective to produce and nevertheless allows for the screw to be retained in optimal fashion in the pre-fitted state, wherein, in its pre-fitted state, the screw is already oriented correctly for definitive fitting purposes. This is achieved here by the angled retaining bracket 1 as a whole, including the restraining means, being produced from plastics material. It can thus be applied to the screw 2 by injection molding. In the embodiment illustrated here, the angled bracket 1, once again, has the first and second limbs 10, 11, which preferably form a right angle. A retaining ring 141 is arranged centrally in the through-opening of the first limb 10 and is connected to the first limb 10 by a crosspiece 142. In this case there are three crosspieces 142 present, these being distributed uniformly over the circumference. The retaining ring 141 has an accommodating through-opening 143, through which the screw 2 passes. The retaining ring 141 thus forms the retaining means for the screw 2 in its pre-fitted state.

The crosspieces 142 preferably have predetermined breaking points or are designed to be thin or weak enough to break when the screw 2 is being screwed in during the fitting operation of the seal, it thus being possible for the screw 2 to be screwed definitively into the door.

The first limb 10 is preferably of sufficiently thick design for the angled retaining bracket 1, even when configured from plastics material, to be sufficiently stable to retain the drop-down seal in the door. As can be seen in the figures, said first limb is preferably thicker than the second limb 11.

In one embodiment, the angled retaining bracket 1 made of plastics material is produced in the form of a discrete single-piece element and is connected to the screw at a later stage, for example welded, adhesively bonded or connected by a press fit at a later stage.

It is preferable, however, for the angled retaining bracket 1 to be applied to the screw 2 by injection molding, the retaining ring 141 therefore being produced by virtue of the screw 2 being overmolded.

All the above described embodiments of the angled retaining bracket with restraining means formed thereon in one piece can be produced from metal or plastics material. If they are produced from plastics material, they can be made in the form of discrete elements and connected to the screw at a later stage. It is also possible, however, for them to be applied in this form to the screw, in particular a metal screw, by injection molding.

In the drawings mentioned, some of the screws are illustrated without threads. This has been done merely in order to simplify the illustration. Each of the screws has a thread.

The individual features of the embodiments mentioned above can be combined with one another in addition to form yet more embodiments.

The sealing device according to the invention and the angled retaining bracket according to the invention allow the angled retaining bracket to be fitted on the door leaf using one hand and thus facilitate the fitting of the seal.

LIST OF REFERENCE SIGNS

1 Angled fastening bracket
10 First limb
100 Introduction means
101 Convexity
102 Longitudinal slot
103 Elevation
104 Depression
11 Second limb
12 Through-opening
13 Countersink
14 Arm
14' Second arm
14" Third arm
14''' Fourth arm
140 Restraining finger
141 Retaining ring
142 Crosspiece
143 Accommodating opening
15 Recess
2 Screw
20 Screw shank
21 Screw head
22 Narrowing
23 Thread turn
3 Seal
30 Housing rail
31 Carrier rail
32 Sealing element
33 Groove
4 Insert element
40 Flange
41 Main body
410 Countersink
42 Restraining nose
43 Arm
44 Through-opening
5 Droplet of adhesive
T Door leaf
B Floor

The invention claimed is:

1. A sealing device for a door or a window, wherein the sealing device has a housing rail and a sealing strip, which is retained in the housing rail, and wherein the seal also has at least one fastening means for fastening the housing rail on a door leaf or window casement, wherein the fastening means comprises a plate for resting on an end surface of the door leaf or window casement and also comprises a through-opening for a screw, said through-opening being arranged in the plate, wherein a restraining means for retaining the screw is present in the through-opening, wherein the restraining means has at least one arm for retaining the screw, wherein the arm is arranged in the through-opening.

2. The sealing device as claimed in claim 1, wherein at least three arms are present, said arms being arranged in the through-opening in a manner distributed over the circumference of the same.

3. The sealing device as claimed in claim 2, wherein the at least three arms are directed radially toward a center point of the through-opening.

4. The sealing device as claimed in claim 1, wherein the at least one arm runs in a plane defined by the through-opening.

5. The sealing device as claimed in claim 1, wherein the at least one arm is of bendable design such that it can be bent out of the through-opening when the screw is being screwed in.

6. The sealing device as claimed in claim 1, wherein precisely four arms are present.

7. The sealing device as claimed in claim 1, wherein more than one arm is present, and wherein the arms are oriented such that, in the pre-fitted state of the screw, they engage in turns of a thread of the screw in an offset manner along the course of said thread.

8. The sealing device as claimed in claim 1, wherein at least one arm has a bent restraining finger in order to retain the screw at an angle other than 90° in relation to the plate.

9. The sealing device as claimed in claim 1, wherein at least one arm has a bent restraining finger in order to retain the screw in parallel to a longitudinal direction of the housing rail.

10. The sealing device as claimed in claim 1, wherein a droplet of adhesive is present in addition to the restraining means, said droplet of adhesive fixing the screw in its pre-fitted position.

11. The sealing arrangement as claimed in claim 1, wherein the fastening means is an angled retaining bracket and the restraining means is produced from plastics material and the angled retaining bracket and the restraining means are formed together in one piece.

12. The sealing arrangement as claimed in claim 11, wherein the angled retaining bracket is applied to the screw by injection molding.

13. The sealing device as claimed in claim 1, wherein the housing rail has a u-shaped cross section with two side walls and an upper crosspiece, which connects the two side walls to one another, and wherein the plate runs at an angle of 90° or greater in relation to the crosspiece.

14. The sealing device as claimed in claim 1, wherein the housing rail has a u-shaped cross section with two side walls and an upper crosspiece, which connects the two side walls to one another, and wherein the fastening means is an angled retaining bracket with a first and a second limb, wherein the first limb forms the plate with the through-opening and the second limb can be pushed into the housing rail beneath the crosspiece.

15. The sealing device as claimed in claim 14, wherein the first limb, in the non-fitted state of the angled retaining bracket, runs at an angle of 90° or greater in relation to the second limb.

16. The sealing device as claimed in claim 14, wherein at least one restraining element for retaining the angled retaining bracket in the housing rail is present on the second limb.

17. The sealing device as claimed in claim 16, wherein said at least one restraining element is at least one of an elevation and a depression and a widened portion of the second limb.

18. A sealing device for a door or a window, wherein the sealing device has a housing rail and a sealing strip, which is retained in the housing rail, and wherein the seal also has at least one fastening means for fastening the housing rail on a door leaf or window casement, wherein the fastening means comprises a plate for resting on an end surface of the door leaf or window casement and also comprises a through-opening for a screw, said through-opening being arranged in the plate, wherein a restraining means for retaining the screw is present in the through-opening, wherein the restraining means is an insert element which can be fixed in the through-opening.

19. An insert element of a sealing device as claimed in claim 18, wherein the insert element has an annular main body with a through-opening for the through-passage of the screw, wherein at least one arm is arranged in said through-opening for the purpose of retaining the screw.

20. A sealing device for a door or a window, wherein the sealing device has a housing rail and a sealing strip, which is retained in the housing rail, and wherein the seal also has at least one fastening means for fastening the housing rail on a door leaf or window casement, wherein the fastening means comprises a plate for resting on an end surface of the door leaf or window casement and also comprises a through-opening for a screw, said through-opening being arranged in the plate, wherein a restraining means for retaining the screw is present in the through-opening, wherein the restraining means is applied to the screw or to the plate by injection molding.

21. A fastening means of a sealing device as claimed in claim 1, wherein the fastening means is an angled retaining bracket with a first and a second limb, wherein the first limb forms a plate for resting on an end surface of a door leaf or window casement and has a through-opening for a screw, wherein a restraining means for retaining the screw is present in the through-opening, wherein the restraining means has at least one arm, which is arranged in the through-opening.

22. The fastening means as claimed in claim 21, wherein the restraining means consists of plastics material and is applied to the angled retaining bracket by injection molding.

23. The sealing device as claimed in claim 21, wherein the angled retaining bracket and the restraining means are formed together in one piece from plastics material.

\* \* \* \* \*